Oct. 5, 1926.
G. W. BULLEY
1,601,716
VULCANIZING PRESS
Filed Jan. 8, 1926
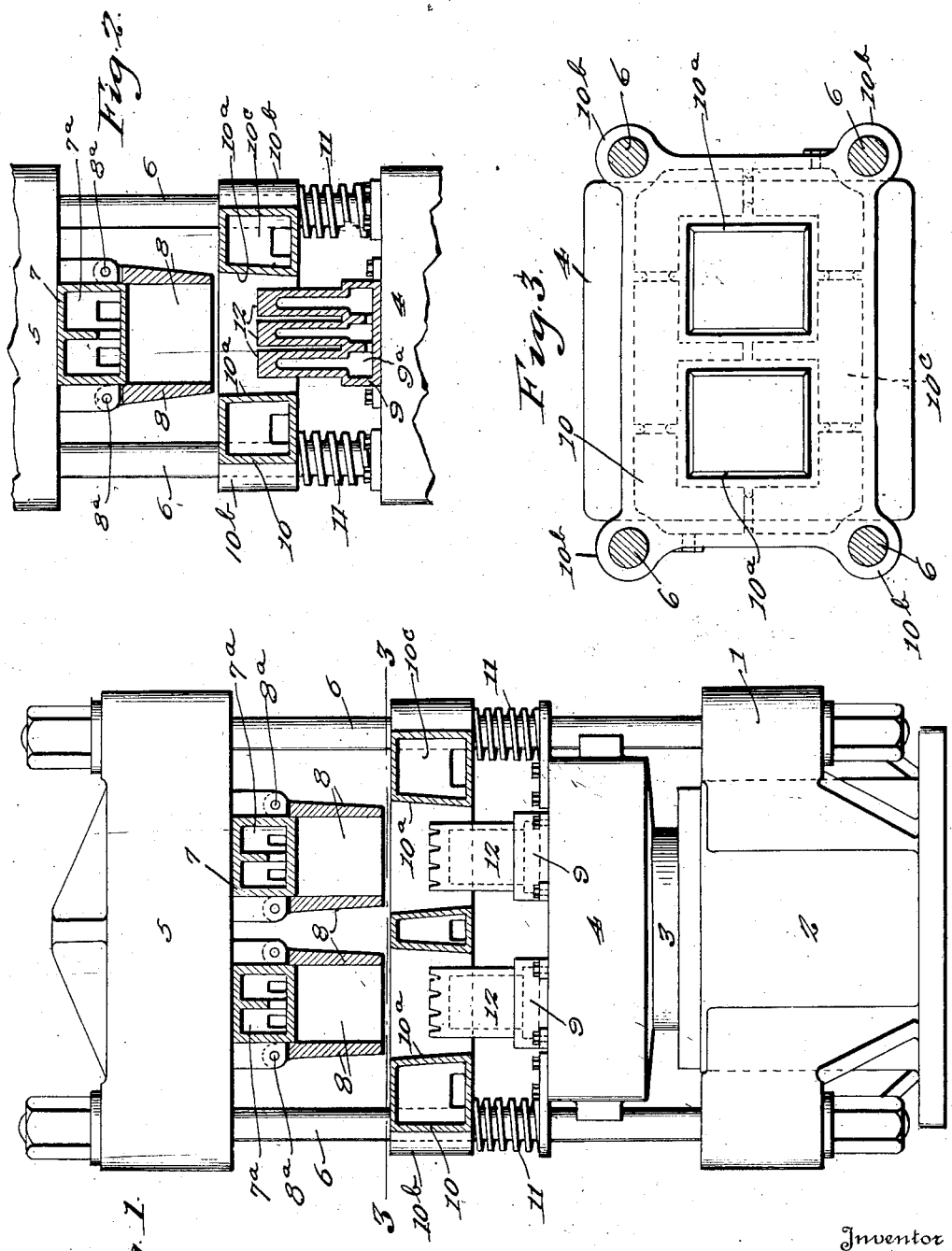

Patented Oct. 5, 1926.

1,601,716

UNITED STATES PATENT OFFICE.

GEORGE W. BULLEY, OF AKRON, OHIO, ASSIGNOR TO THE MILLER RUBBER COMPANY, OF AKRON, OHIO, A CORPORATION OF OHIO.

VULCANIZING PRESS.

Application filed January 8, 1926. Serial No. 80,090.

My present invention relates to improvements in vulcanizing presses, and is shown herein as embodied in a press adapted for shaping and vulcanizing hard rubber battery boxes or cases, though not limited to such use.

The invention aims to provide an exceedingly simple, durable and efficient press in which the plastic material may be automatically shaped around the core and thus held during vulcanization, and in which on the reverse action of the press, the core or cores will be started or cracked loose from the vulcanized article before the latter is released by the mold walls.

With these and other objects in view, the invention includes the novel features of construction and arrangement and combination of parts hereinafter described, and particularly defined by the appended claims.

What I at present consider the preferred embodiment of said invention is illustrated in the accompanying drawing, in which—

Figure 1 represents an elevation of the press with parts in section.

Fig. 2 is a sectional view of the intermediate portion, at right angles to Fig. 1, and Fig. 3 is a horizontal section.

Referring by reference characters to this drawing, the press is shown as comprising a base 1 including a ram cylinder 2 and ram piston 3 movable therein in the usual manner, and carrying at its upper end the movable platen 4. 5 designates the press head supported from and tied to the base by the rods 6 in the customary manner, four of such rods being used, one at each corner of the press though only two show. The platen is preferably slidably guided by the rods passing through vertical holes in the corners of the platen.

The head 5 carries on its under face a mold plate 7, which is preferably removably secured thereto in any suitable manner, as by bolts, to permit its removal and replacement, which attachment may be made by tap screws, and it is provided with a steam chamber 7ª to which steam may be admitted by a pipe leading to a source of steam supply (not shown).

To the four edges of this mold plate 7 are secured four mold plates 8 for forming the sides and ends of the mold, these plates being articulated on loose hinge pins 8ª and being tapered on their outer edges to cooperate with the tapered walls 10ª of a mold clamping member 10. In the present case two sets of mold plates are shown for forming two articles.

The front mold member 8 is omitted to show the interior faces of the others.

The mold clamping member 10 is slidably guided by the rod 6 by reason of having horizontal projecting portions 10ᵇ provided with vertical holes through which the rods or posts 6 pass.

Encircling each of the posts between the projections 10 and the platen is a helical compression spring 11, these springs tending to keep the clamping member yieldingly supported a certain distance above the platen. The walls of the mold clamping member are provided with steam chambers 10ᶜ to which steam may be supplied by flexible pipe connections (not shown).

Detachably secured to the platen 4 is a mold closure member 9 designed to cooperate with the free edges of the hinged mold sections to complete the mold cavity, and this plate 9 carries the core means for shaping the inside of the box. In the example shown in the drawings the core means is shown as composing three core members 12 for forming a box having three cell compartments, which is the most usual form of battery box.

The core members are provided with steam cavities to which steam may be admitted by flexible pipes (not shown) connected to passages 9ª in the plate 9.

In operation, and with the parts in the position shown in the drawing, a lump or batch of hard vulcanizing rubber compound is placed on top of the core members, the quantity being preferably determined by weight, and the ram is elevated to move the platen upwardly. In the upward movement the mold sections 8 first enter the cavity 10ª of the clamping member, the inclined walls of which, cooperating with the inclined outer faces of the mold sections, causes the latter to be forced together at the corners making a tight closure.

On further upward movement of the ram, the core and plate 9 move up relative to the now stationary clamp 10, the springs 11 yielding to allow this action, and the rubber compound is forced down around the cores.

By the time the limit of upward movement is reached the plate 9 closes the lower end of the mold and the mold cavity is full.

Steam is kept on till vulcanization is complete, whereupon the ram is lowered.

The tendency of the core to stick to the article is counteracted by the springs 11 which cause the platen 4 and core to move down before the mold clamp 10 starts to move and thus the core is cracked loose from the molded article before the latter is released by the mold and without danger of injuring the article.

Further downward movement of the ram allows the clamp to drop to the position shown in the dawing, whereupon the article may be removed from the mold by swinging one or more of the mold sections outwardly.

Having thus described my invention, what I claim is:—

1. A vulcanizing press having a fixed head, a mold carried thereby including movable side plates, a mold clamping member mounted for movement vertically of the press and adapted, when moved upwardly, to engage and clamp the mold sides, a ram, core and mold closure means carried by said ram, and yieldable presser means interposed between the ram and mold clamp.

2. A vulcanizing press having a fixed head, a base mold plate carried thereby, side mold plates hinged to said base mold plate and having inclined outer faces, a mold clamp mounted for movement vertically of the press and having inclined inner walls to coact with said side mold plates, a ram carrying a mold closure plate and core means, and yielding pressure exerting means interposed between the ram and mold clamp.

3. A vulcanizing press having a fixed head supported by corner posts, a mold base carried by said head, mold sides hinged to said base, a mold clamp slidably carried by said posts, and adapted to clamp the sides together, a ram, a press platen operated by said ram and guided by said posts, mold closure and core means carried by said platen, and helical springs encircling the posts between the mold clamp and platen.

In testimony whereof I affix my signature.

GEORGE W. BULLEY.